(12) United States Patent
Sweeney

(10) Patent No.: US 7,992,751 B1
(45) Date of Patent: Aug. 9, 2011

(54) CARGO CARRIER

(76) Inventor: Larry L. Sweeney, Battle Mountain, NV (US)

( * ) Notice: Subject to any disclaimer, the term of this patent is extended or adjusted under 35 U.S.C. 154(b) by 1046 days.

(21) Appl. No.: 11/881,734

(22) Filed: Jul. 27, 2007

Related U.S. Application Data

(60) Provisional application No. 60/833,723, filed on Jul. 28, 2006.

(51) Int. Cl.
B60R 9/00 (2006.01)
B60R 11/00 (2006.01)
B60R 9/06 (2006.01)
B60P 9/00 (2006.01)

(52) U.S. Cl. ........ 224/497; 224/499; 224/503; 224/509; 224/519; 224/524; 414/462; 280/769

(58) Field of Classification Search .................. 224/497, 224/519, 499, 524, 508, 509; 414/462; 280/769
See application file for complete search history.

(56) References Cited

U.S. PATENT DOCUMENTS

| 1,585,871 | A | * | 5/1926 | Pels | 224/497 |
| 2,624,451 | A | * | 1/1953 | Ewing | 206/541 |
| 5,427,289 | A | | 6/1995 | Ostor | |
| 5,806,737 | A | | 9/1998 | Clark | |
| 6,095,387 | A | | 8/2000 | Lipscomb | |
| 6,202,909 | B1 | | 3/2001 | Belinky et al. | |
| 6,293,451 | B1 | | 9/2001 | LeMay et al. | |
| 6,712,248 | B2 | * | 3/2004 | Mitchell | 224/499 |
| 2003/0173387 | A1 | | 9/2003 | Mitchell | |
| 2005/0035167 | A1 | | 2/2005 | Threet et al. | |

* cited by examiner

Primary Examiner — Justin M Larson
Assistant Examiner — Lester L Vanterpool
(74) Attorney, Agent, or Firm — Richard John Bartz

(57) ABSTRACT

A cargo carrier mountable onto a trailer hitch of a vehicle has a two-piece tubular housing having an internal chamber for accommodating link members and rigid bars used to retain the housing in an expanded open position. A hitch bar secured to the housing is adapted to be coupled to the trailer hitch on the vehicle.

13 Claims, 6 Drawing Sheets

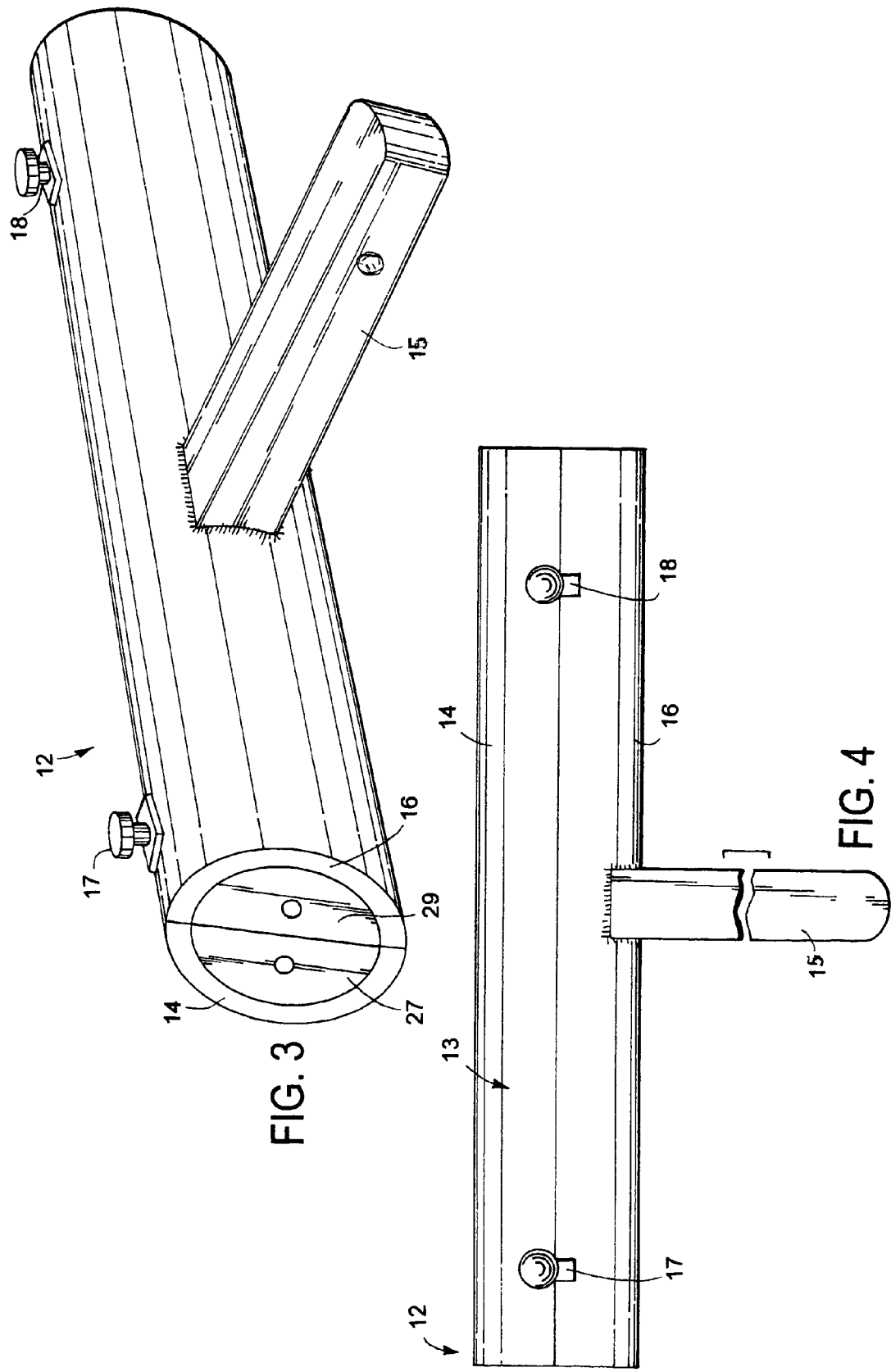

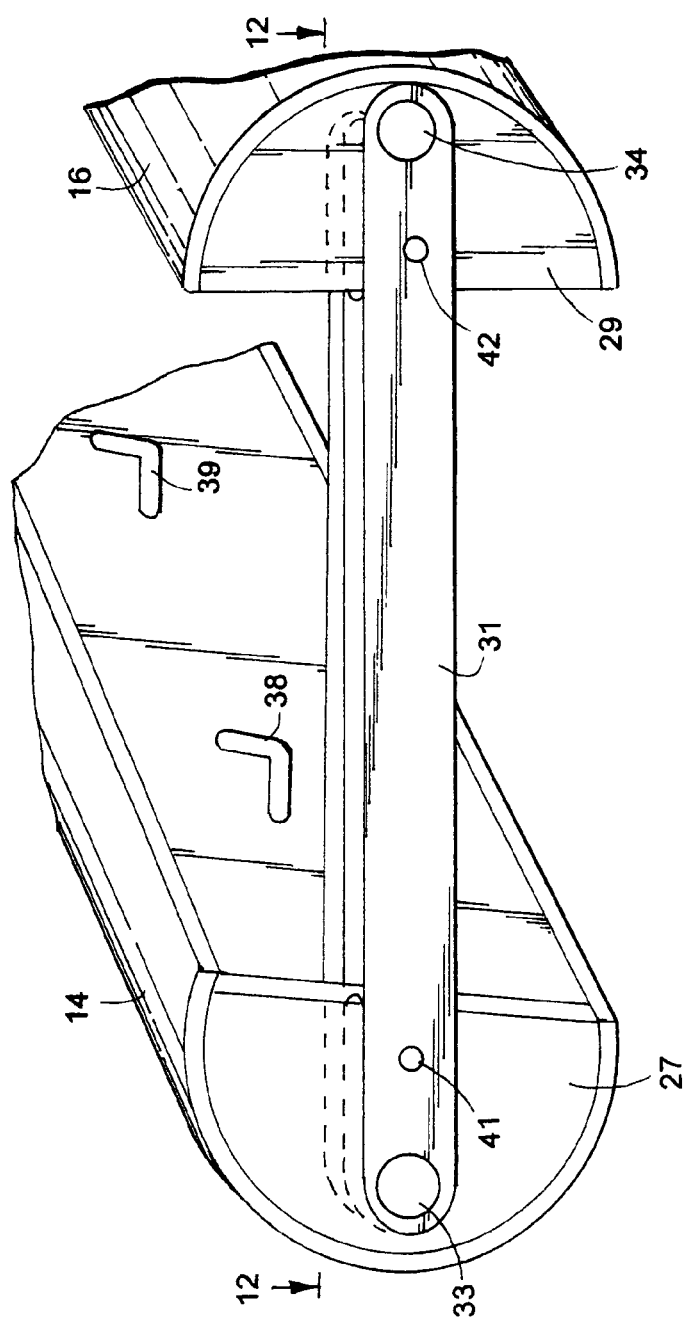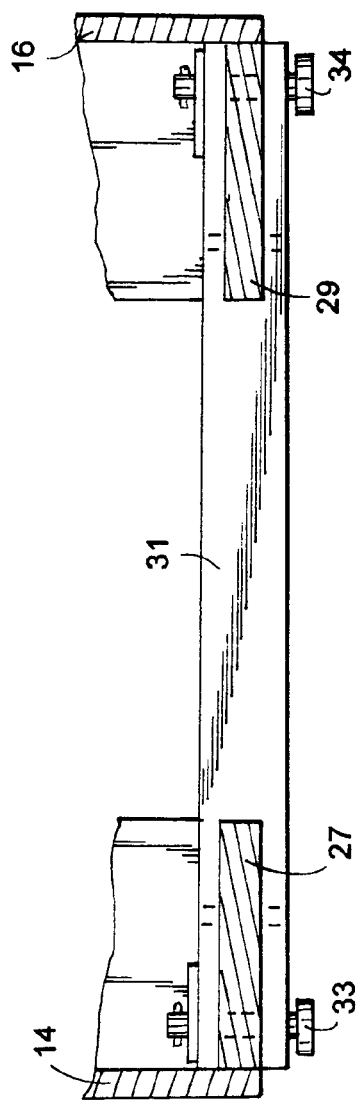

CARGO CARRIER

CROSS REFERENCE TO RELATED APPLICATION

This application claims the benefit of U.S. Provisional Application Ser. No. 60/833,723 filed Jul. 28, 2006.

FIELD OF THE INVENTION

The invention relates to a cargo carrier attachable to a conventional hitch on a vehicle and, in particular, to a cargo carrier that is contractible to a compact cylindrical configuration and removable from the hitch on a motor vehicle.

BACKGROUND OF THE INVENTION

Motor vehicles have rear compartments and trunks for storing luggage and other articles. Separate cases mounted the backs of motor vehicles have also been used for additional article storage spaces. Bicycle racks are connected to trailer hitches mounted on the rear frames of motor vehicles for carrying one or more bicycles. The trunks and bicycle racks are relatively large and bulky and not amenable to compact storage on and within the vehicle interior when not in use. Separate cargo carriers have been designed to connect directly to conventional trailer hitches mounted on the frames of motor vehicles. Examples of carriers attachable to hitches on motor vehicles are disclosed in the following U.S. patents.

P. A. Oster in U.S. Pat. No. 5,427,289 discloses a carrier attachable to a trailer hitch having a hinged tray or shelf that can be lowered to a horizontal position to support cargo and pivoted to an upright storage position.

A. G. Lipscomb in U.S. Pat. No. 6,095,387 describes and shows a cargo carrier attachable to a vehicle for transporting bicycles. The carrier has a main support bar and multiple support rods interconnected to provide a platform for supporting cargo.

J. S. Belinky and D. A. Young in U.S. Pat. No. 6,202,909 disclose a cargo carrier having an elongated drawbar and a platform mounted on the drawbar. The drawbar has a forward end telescoped into a conventional vehicle trailer hitch.

L. T. LeMay and T. D. Trotter in U.S. Pat. No. 6,293,451 describes a cargo carrier having a telescoping assembly to mount a cargo unit to a trailer hitch attachable to a vehicle. The telescoping assembly is operable to longitudinally move the cargo unit toward and away from the vehicle.

SUMMARY OF THE INVENTION

The cargo carrier of the invention is adapted to be mounted on a conventional trailer hitch on the rear frame of a motor vehicle, such as an automobile, van, pick-up truck, or motor home. The cargo carrier is a two part generally cylindrical housing having a contracted compact storage closed position and an expanded cargo holding open position. A hitch bar secured to the housing is adapted to be coupled to and uncoupled from the trailer hitch to allow the cargo carrier to be stored in its closed position. Link members connected to the housing are operable to allow the housing to be separated to the cargo holding open position. Rigid brackets extended between and attached to the housing maintain the housing in the cargo holding open position. Latches mounted on the housing are operable to retain the housing in the closed position. The latches are releasable to allow the housing to be moved between its closed and open positions.

A preferred embodiment of the cargo carrier has a two piece tubular housing having separate semi-circular elongated first and second sections with facing sides, opposite ends and an internal chamber between the first and second sections. A hitch bar secured to one of the sections of the housing is used to couple the cargo carrier to a conventional tubular hitch mounted on a frame of a motor vehicle. The first and second sections of the housing are connected with hinge members and rigid brackets to maintain the first and second sections of the housing in spaced apart open positions. The hinge members and rigid brackets are stored in the chamber between the first and second sections of the housing when the housing is in its closed position. Latches mounted on the first and second sections of the housing are operable to retain the housing in its closed position. The latches are releasable to allow the first and second sections to be moved to open and closed positions.

DESCRIPTION OF THE DRAWING

FIG. 3 is a perspective view of the cargo carrier;

FIG. 4 is a top plan view of the cargo carrier of FIG. 3 with the hitch bar foreshortened;

FIG. 11 is a foreshortened perspective view of the cargo carrier in the open position; and FIG. 12 is a sectional view taken along line 12-12 of FIG. 11.

DETAILED DESCRIPTION OF THE INVENTION

In the following description of the cargo carrier reference is made to the accompanying drawing that form a part hereof, and show a specific embodiment in which the invention may be practiced. It is to be understood that other embodiments of the cargo carrier may be utilized and structural changes may be made without departing from the scope of the invention.

Figure 1:
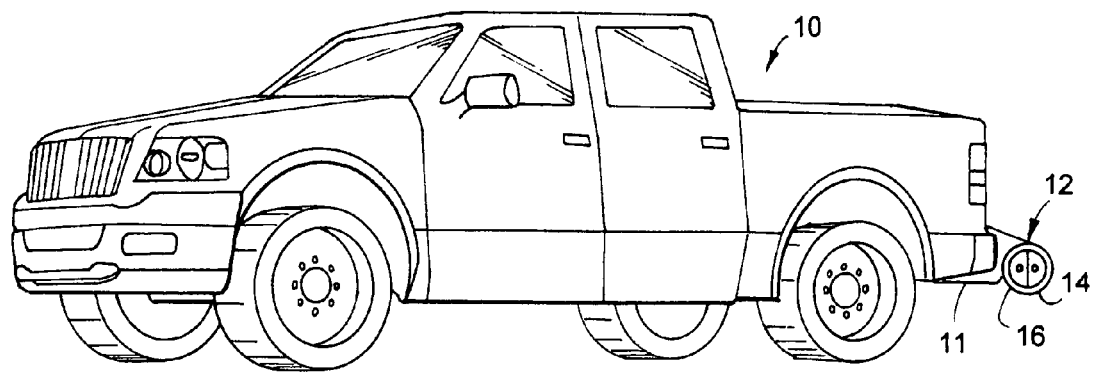
FIG. 1 is a perspective view of a pick-up truck having a tubular rear trailer hitch connected to the cargo carrier of the invention.
Figure 2:
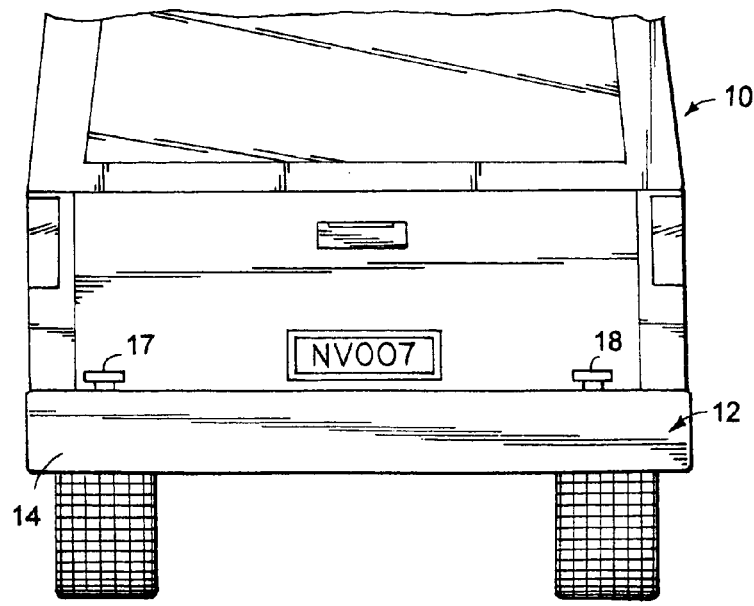
FIG. 2 is an enlarged rear elevational view of FIG. 1.

As shown in FIG. 1, a motor vehicle 10 has a conventional tubular trailer hitch 11 attachable to the vehicle's rear frame. Cargo carrier 12 of the invention mounted on hitch 11 extends transversely along the back of the rear bumper of vehicle 10. Motor vehicle 10 is shown as a pick-up truck. Other types of vehicles, such as automobiles, utility vans, motor homes and trailers with hitches can be used with cargo carrier 12. Cargo carrier 12 has a two-piece tubular housing 13 with longitudinal semi-circular housing sections 13 and 16. Housing 13 is located behind and generally parallel to the rear bumper of vehicle 10. Housing 13 can be made of metal, plastic, or other rigid materials. Housing sections 14 and 16 can have channel shaped cross sections and other shapes.

A horizontal hitch bar 15 is secured with welds to the front center of the front of section 16. Bar 15 is an elongated square member adapted to telescope into a conventional tubular trailer hitch 11. A release lock pin (not shown) retains bar 15 in assembled relation with trailer hitch 11. Other types of hitch structures can be used to mount cargo carrier 12 on a vehicle.

Figure 10:
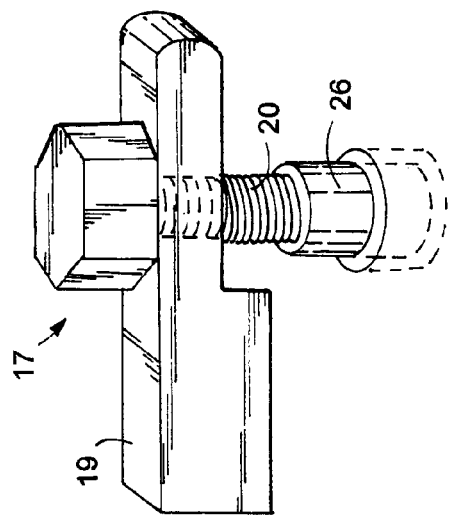
FIG. 10 is a perspective view of a latch for holding the housing sections of the cargo carrier together.
Figure 9:
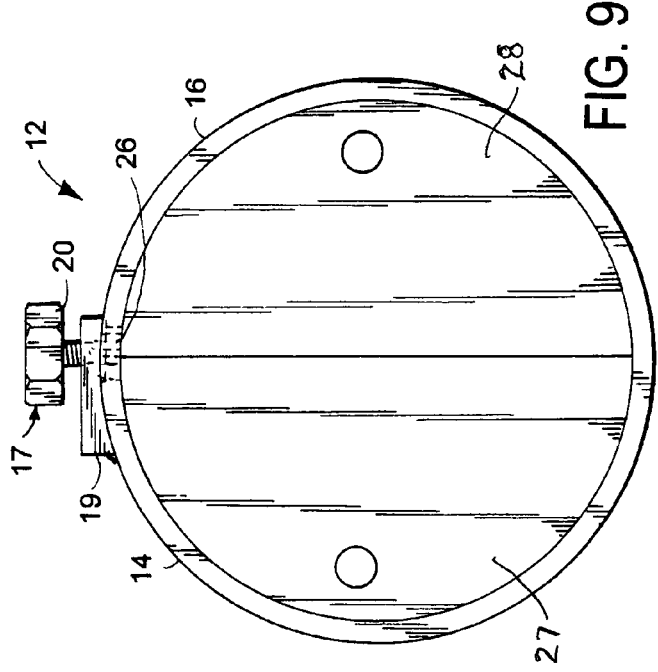
FIG. 9 is an enlarged end elevational view of the cargo carrier in the closed position.

Latches 17 and 18 hold housing sections 14 and 16 in face to face closed positions. As shown in FIGS. 9 and 10, a latch 17 comprises a tab 19 secured to the top of housing section 14 and a threaded member 20 turned into tab 19. The lower end of threaded member 20 is swedged on a nut 26 mounted on housing section 16. Threaded member 20 has a large cylindrical head to facilitate manual turning of threaded member 20 to secure housing sections 14 and 16 in their closed positions. Latch 18 has the same structure as latch 17. Latches 17 and 18 are released to allow sections 14 and 16 to move to open positions. Other releasable devices can be used to retain sections 14 and 16 in a generally cylindrical closed configuration and allow sections 14 and 16 to be moved to an open condition.

Figure 5:
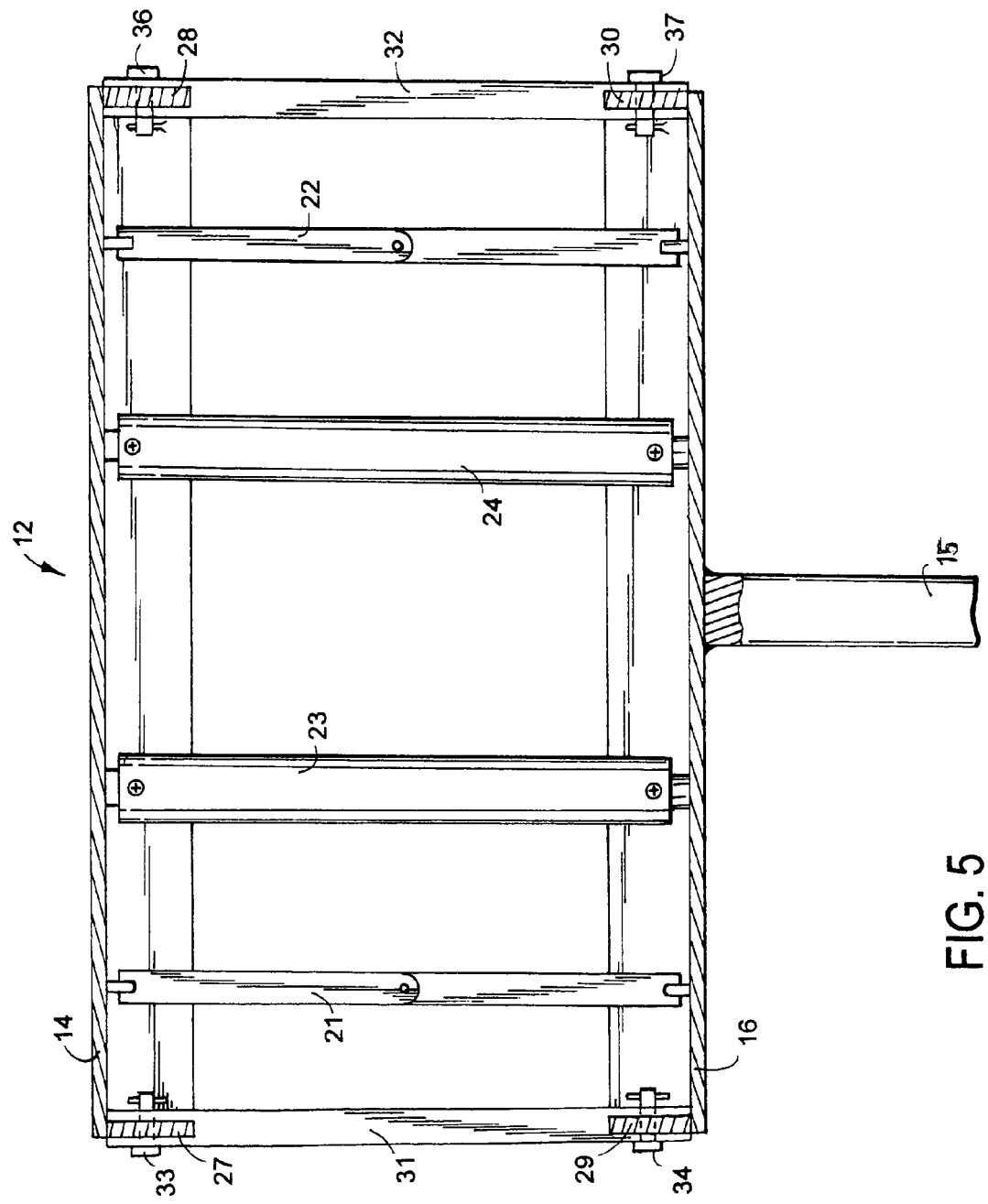
FIG. 5 is a top plan view, partly sectioned, of the cargo carrier in the open position.
Figure 6:
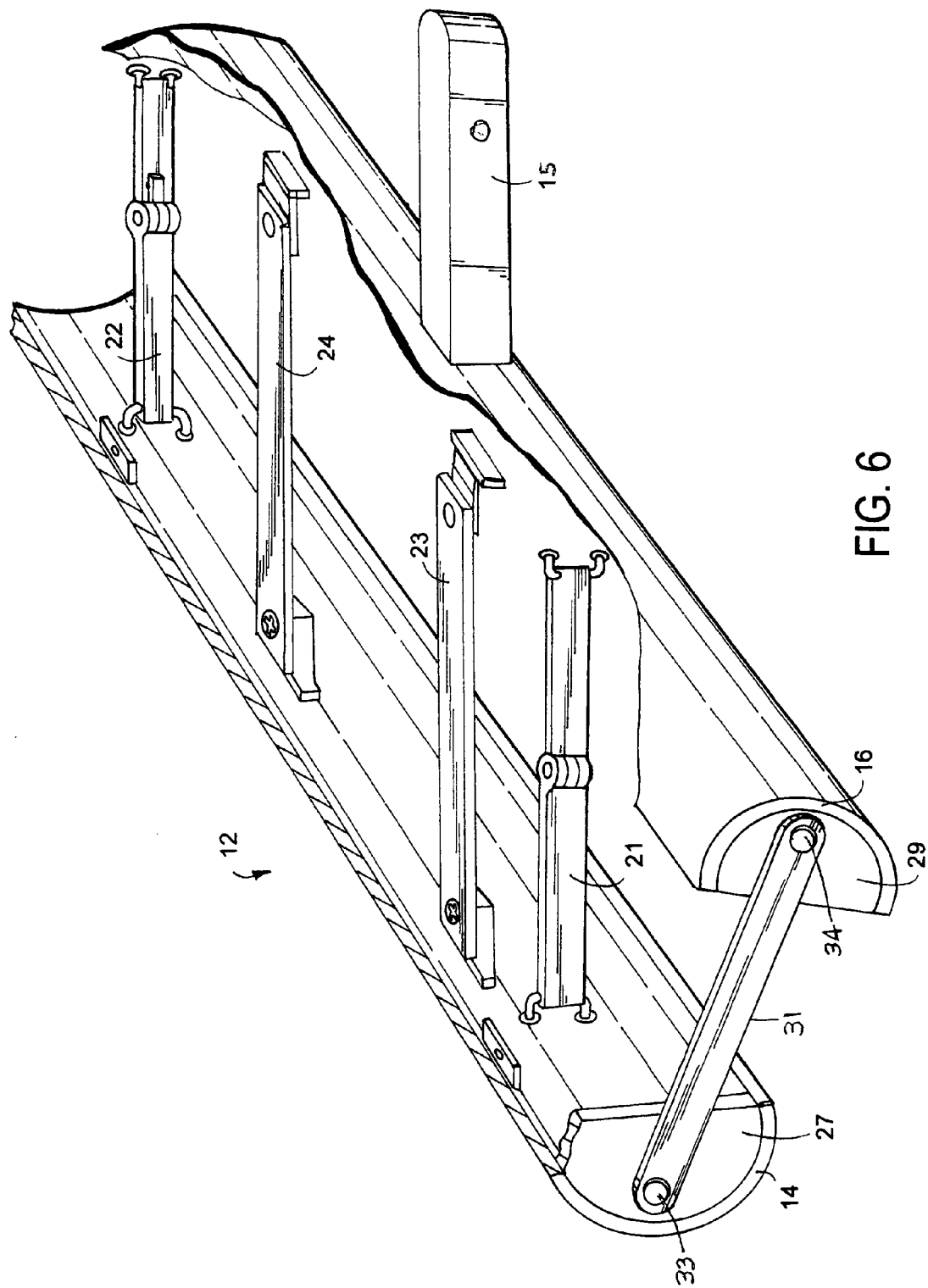
FIG. 6 is a perspective view of the cargo carrier in the open position.
Figure 7:
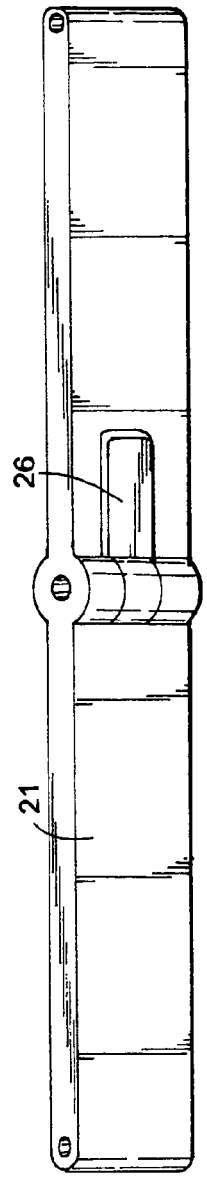
FIG. 7 is a side elevational view of a hinge included in the cargo carrier shown in FIG. 5.
Figure 8:
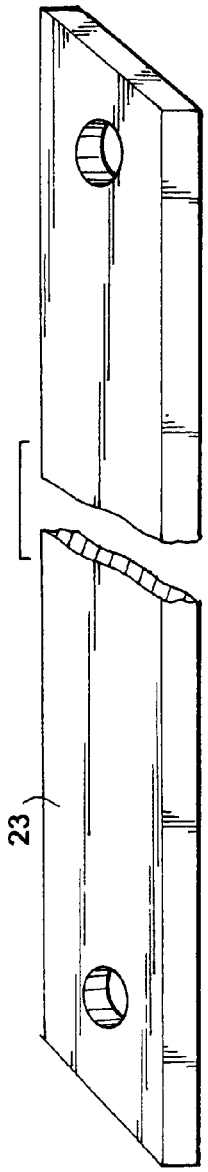
FIG. 8 is a perspective view of a bracket included in the cargo carrier shown in FIG. 5.

As shown in FIGS. 5 and 6, hinges 21 and 22 and rigid brackets 23 and 24 retain cargo carrier 12 in its open position. FIG. 7 shows the over center stop 26 for hinge 21 that retains hinge 21 in an elongated condition. Brackets 23 and 24 hold hinges 21 and 22 in over center positions. Each hinge 21 and 22 has first and second members with adjacent inner ends pivotally connected with an upright pivot member. Additional pivot members connect the outer ends of the first and second members to the first and second sections 14 and 16 of housing 13. The first and second members are maintained in over center positions with stops 26 and rigid brackets 23 and 24. Brackets 23 and 24, as shown in FIG. 8, are flat rectangular plates attached with fasteners to the inside walls of first and second sections 14 and 16 of housing 13. The plates have flat top surfaces for supporting cargo.

As shown in FIGS. 5, 6, 11 and 12, semi-circular plates 27 and 28 are secured to opposite ends of housing section 14. Semi-circular plates 29 and 30 secured to opposite ends of housing section 16 have vertical flat ends engageable with the flat ends of plates 27 and 28 to close the opposite ends of housing 13 as shown in FIG. 3. The opposite ends of sections 14 and 16 can have a spherical quadrant configuration to avoid right angle edges at the ends of sections 14 and 16. Rigid bars 31 and 32 connected to plates 27 and 29 with pins 33 and 34 and to plates 28 and 30 with pins 36 and 37 retain housing sections 14 and 16 in open or expanded positions as shown in FIGS. 5, 11 and 12. The opposite ends of bars 31 and 32 have inwardly directed slots to accommodate plates 27 and 30. As seen in FIG. 11, housing section 14 supports hooks 38 and 39 used to store bars 31 and 32 within housing 13. Bars 31 and 32 have holes 41 and 42 in the end sections to accommodate hooks 38 and 39. Other structures can be used to hold cargo carrier 12 in the open or extended position.

It is to be understood that changes in the form, arrangement of parts, structure and elements of the cargo carrier and hitch bar can be made by persons skilled in the art without departing from the scope of the invention as defined by the appended claims.

The invention claimed is:

1. A carrier mountable onto a trailer hitch of a vehicle comprising: a two-piece tubular housing having semi-circular elongated first and second sections and an internal chamber between said first and second sections, each of said first and second sections having open opposite ends, transverse semi-circular plates secured to the opposite ends of the first and second sections, an elongated bar secured to one of the first and second sections of the housing for mounting the carrier on the trailer hitch of the vehicle, link members connecting the first and second sections of the housing operable to allow the first and second sections of the housing to be moved between side-by-side closed positions and laterally spaced open positions, said plates closing the open opposite ends of the first and second sections when the first and second sections are in the side-by-side closed positions, at least one one-piece rigid bracket extended between and attached to the first and second sections of the housing to maintain the first and second sections in said laterally spaced open positions, a rigid bar extended between adjacent plates, connectors attaching the rigid bar to the adjacent plates to maintain the first and second sections of the housing in the laterally spaced positions, and latches mounted on the first and second sections of the housing operable to retain the first and second sections of the housing in face-to-face closed positions and maintain the adjacent plates in positions closing the open ends of the first and second sections of the housing, said latches being releasable to allow the first and second sections of the housing to be moved between the open and closed positions.

2. The carrier of claim 1 including: pivot members pivotally connecting the link members to the first and second sections of the housing.

3. The carrier of claim 1 wherein: each of the link members include first and second members, a first pivot member connecting the first and second members to allow the first and second members to fold into the chamber between the first and second sections of the housing in its closed position, and second pivot members pivotally connecting the first and second members to the first and second sections of the housing.

4. The carrier of claim 1 including: connectors attaching the rigid brackets to the first and second sections of the housing.

5. The carrier of claim 1 wherein: the latches comprise tabs secured to the first section of the housing and threaded members operatively associated with the tabs attached to the second section of the housing.

6. A carrier mountable onto a hitch of a vehicle comprising: a housing having first and second sections and an internal chamber between said first and second sections, each of said first and second sections having open opposite ends, plates secured to the opposite ends of the first and second sections, a bar secured to one of the first and second sections adapted to be coupled to a hitch on a vehicle, link members connected to the first and second sections of the housing operable to allow the first and second sections of the housing to be moved between side-by-side closed positions and laterally spaced open positions, a rigid bar extended between adjacent plates, connectors attaching the rigid bar to adjacent plates to maintain the first and second sections of the housing in laterally spaced positions, and at least one latch mounted on the first and second sections of the housing operable to retain the first and second sections of the housing in side-by-side closed positions and maintain the adjacent plates in positions closing the open ends of the first and second sections of the housing, said latch being releasable to allow the first and second sections of the housing to be moved between the open and closed positions.

7. The carrier of claim 6 including: pivot members pivotally connecting the link members to the first and second sections of the housing.

8. The carrier of claim 6 wherein: each of the link members including first and second members, a first pivot member connecting the first and second members to allow the first and second members to fold into the chamber between the first and second sections of the housing in its closed position, and second pivot members pivotally connecting the first and second members to the first and second sections of the housing.

9. The carrier of claim 6 including: rigid brackets extended between and attached to the first and second sections of the housing operable to maintain the first and second sections in laterally spaced positions, and connectors attaching the rigid brackets to the first and second sections of the housing.

10. The carrier of claim 6 wherein: the at least one latch comprises a tab secured to the first section of the housing and a threaded member operatively associated with the tab attached to the second section of the housing.

11. A carrier mountable onto a trailer hitch of a vehicle comprising: a two-piece tubular housing having semi-circular elongated first and second sections having facing sides and open opposite ends, end plates secured to the opposite ends of the first and second sections, and an internal chamber between said first and second sections, hinge members including first and second members, a first pivot member connecting the first and second members and second pivot members pivotally connecting the first and second members to the first and second sections of the housing to allow the first and second members to fold into the chamber of the housing when the first and second sections of the housing are in side-by-side closed positions, latches mounted on the first and second sections operable to retain the first and second sections of the housing in the side-by-side closed positions and maintain the plates at the opposite ends of the first and second sections in positions closing the open ends of the first and second sections of the housing, said latches being releasable to allow the first and second sections to be moved to open and closed positions, an elongated bar secured to one of the first and second sections of the housing adapted to be coupled to a trailer hitch of a vehicle, rigid brackets extended between the first and second sections of the housing when the first and second sections are in the open spaced positions, and connectors attaching the brackets to the first and second sections of the housing whereby the brackets maintain the first and second sections in spaced open positions.

12. The carrier of claim 11 including: a rigid bar extended between adjacent end plates, and connectors attaching the rigid bar to said adjacent end plates to maintain the first and second sections in lateral spaced positions.

13. The carrier of claim 11 wherein: the latches comprise tabs secured to the first section of the housing and threaded members operatively associated with the tabs attached to the second section of the housing.

\* \* \* \* \*